United States Patent
Naeumann et al.

(10) Patent No.: US 6,374,956 B1
(45) Date of Patent: Apr. 23, 2002

(54) BRAKE ASSEMBLY WITH A NONMETAL FRICTION RING AND METHOD OF MAKING SAME

(75) Inventors: Emil Naeumann, Ebersbach; Hans-Goerg Riedel, Pforzheim; Detlef Sokolowsky, Esslingen; Bjoern Spangemacher, Sindelfingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/471,407

(22) Filed: Dec. 23, 1999

(30) Foreign Application Priority Data

Dec. 23, 1998 (DE) .......................... 198 59 616

(51) Int. Cl.$^7$ ............................. F16D 65/12
(52) U.S. Cl. ................................... 188/18 A
(58) Field of Search .................. 188/18 A, 218 XL, 188/71.1, 205 A, 206 R

(56) References Cited

U.S. PATENT DOCUMENTS 4,848,521 A * 7/1989 Izumine .................. 188/18 A
4,863,000 A * 9/1989 Patel ..................... 188/170

FOREIGN PATENT DOCUMENTS

| DE | 1897214 | 6/1962 |
|----|---------|--------|
| DE | 2039003 | 2/1971 |
| DE | 2451104 A1 | 5/1976 |
| DE | 2550893 A1 | 5/1977 |
| DE | 8815843.8 | 4/1989 |
| DE | 4438455 C1 | 5/1996 |
| DE | 44 46 017 | 7/1996 |
| DE | 29710533 U1 | 1/1998 |
| DE | 0872659 A1 | 10/1998 |
| DE | 19719634 C1 | 3/1999 |
| DE | 197 19 634 | 3/1999 |
| WO | WO94/02753 | 2/1994 |

\* cited by examiner

*Primary Examiner*—Christopher P. Schwartz
(74) *Attorney, Agent, or Firm*—Crowell & Moring LLP

(57) ABSTRACT

A brake unit has a ceramic friction ring connected directly to a wheel hub by fastening bolts or by a spline shaft connection. To ensure good heat insulation between the friction ring and the hub and to achieve uniform torque transmission between the friction ring and the hub, the contact area between the friction ring and the fastening elements of the hub is provided with a plastically deformable heat-insulating layer.

19 Claims, 7 Drawing Sheets

BRAKE ASSEMBLY WITH A NONMETAL FRICTION RING AND METHOD OF MAKING SAME

BACKGROUND AND SUMMARY OF THE INVENTION

This application claims the priority of German application 198 59 616.2, filed in Germany on Dec. 23, 1998, the disclosure of which is expressly incorporated by reference herein.

The invention relates to a brake unit with a nonmetal friction ring made of a ceramic material that is connected directly to a hub, said hub being made in the form of a sleeve which includes a steering knuckle and to which a wheel is fastened, and with an outer edge of the hub radially overlapping an inner edge of the friction ring and having fastening elements in this overlapping area to connect the friction ring to the hub.

A brake unit according to the species is known for example from German Patent Application No. DE 297 10 533 U1. The brake unit comprises a ceramic friction ring connected to a wheel hub directly by fastening elements, in other words eliminating a brake disk pot. Such a design of the brake unit makes it possible to reduce the inside diameter of the friction ring considerably and thus—while keeping the external radius essentially the same—to considerably increase the frictional surface area swept by the brake pad. Connecting the friction ring directly to the hub has the additional advantage that a higher run-in accuracy of the brake unit can be achieved at low cost by eliminating intermediate elements. In addition, non-metal friction rings are much more wear-resistant by comparison with metal friction rings and therefore have a much longer service life. A brake unit with a ceramic friction ring mounted directly on the wheel hub therefore combines the advantage of a large brake surface and hence a high braking force with that of a long service life.

However, much higher temperatures develop in friction rings made of ceramic composites than when metal friction rings are used. This results in a high thermal load on the parts located in the vicinity of the brake unit especially when as, in the present case, the friction ring is mounted directly on the wheel hub and therefore no heat-dispersing intermediate part is provided between the friction ring and the hub. In addition, ceramic friction rings are very brittle and hard. If the fastening elements provided on the friction ring and hub, by means of which the friction ring is connected to the hub, have inaccuracies caused by manufacturing, because of its negligible plasticity the friction ring cannot deform in operation so that these inaccuracies are compensated. The result is non-uniform participation of the fastening elements in torque transmission and as a result, more rapid wear of those fastening elements that perform the majority of the torque transmission and are therefore subjected to particularly severe loads during operation.

Hence, a goal of the invention is to improve a brake unit according to the species with a ceramic friction ring connected directly to the wheel hub in such fashion that more uniform torque transmission is ensured between the friction ring and the hub and at the same time considerable heat insulation is ensured between the friction ring and the hub.

The goal is achieved according to the invention by providing a brake unit of the above noted type, wherein the contact surface between the friction ring and the fastening elements is provided with a plastically deformable heat-insulating layer.

The contact surface between the friction ring and the fastening element connected with the hub is provided with a plastically deformable heat-insulating layer. This layer decouples the friction ring thermally from the hub and thus reduces the introduction of heat from the friction ring into the hub. The layer also deforms under load because of its plastic properties so that, during operation, uniform loading of all fastening elements, and hence uniform participation of all fastening elements in the torque transmission between the friction ring and the hub, is produced.

If the friction ring is connected to the hub by a circle of bolts that pass axially through the overlapping edges of the friction ring and the hub, the plastically deformable heat-insulating layer between the friction ring and the bolts is advantageously in the form of sleeves made of a plastically deformable material that deform under load so that uniform loading of all the fastening elements and all the holes in the friction ring is produced. A heat-insulating material is selected as the sleeve material or the sleeves are provided with an additional heat-insulating coating to keep the conduction of heat from the friction ring to the hub as low as possible.

To receive the bolts, the hub advantageously has radial driving slots and the friction ring has matching bores that permit low-load expansion between the hub and the friction ring and at the same time ensure that the friction ring is centered.

In an alternative design, the inside edge of the friction ring is connected with the hub by a spline shaft connection. This offers the advantage over conventional connections of a smaller number of individual parts and thus allows cost reductions. The torque transmission between the hub and the friction ring in this case takes place through the flanks of the spline shaft. The flank profile in this case is chosen so that the friction ring is self-centered on the hub and at the same time a low-force radial expansion of the hub is guaranteed and so that when thermal and mechanical deformations of the hub occur, the forces developing between the hub and the friction ring are as low as possible. The contact surface between the friction ring and the hub is provided with a plastically deformable layer to ensure torque transmission that is as uniform as possible; to minimize the heat transmission between the hub and the friction ring, the contact surface between the hub and the friction ring is made as small as possible and provided with a heat-insulating layer.

In order to ensure a high level of strength for the ceramic friction ring, it is recommended to reinforce the ceramic material by adding fiber material according to certain preferred embodiments of the invention.

Connecting the friction ring directly to the wheel hub increases the frictional surface swept by the brake pad by up to 40% by comparison to conventional connection of the friction ring using an intermediate element. An even more pronounced increase in frictional area can be achieved if two (or more) friction rings are mounted on the hub according to certain preferred embodiments of the invention. During the braking process, the friction rings of two outer brake pads are pressed against a brake lining located between the friction rings according to certain preferred embodiments of the invention. After the braking process, the friction rings are moved apart from one another by a restoring spring so that the middle brake lining runs freely between the two friction rings according to certain preferred embodiments of the invention. By using such a double disk brake with hub connection, the frictional areas can be increased by up to 140% by comparison with conventional brake disks.

Another advantage of the double disk brake is the simple design of the friction rings since costly ventilation does not have to be provided.

The brake unit according to the invention is not limited to use in motor vehicles but can also be used in the same way in aircraft and rail vehicles. One important advantage of the brake unit according to the invention consists in the fact that even when the space available for the brake is sharply delimited, a large braking surface is available.

Other objects, advantages and novel features of the present invention will become apparent from the following detailed description of the invention when considered in conjunction with the accompanying drawings.

DETAILED DESCRIPTION OF THE DRAWINGS

Figure 1:
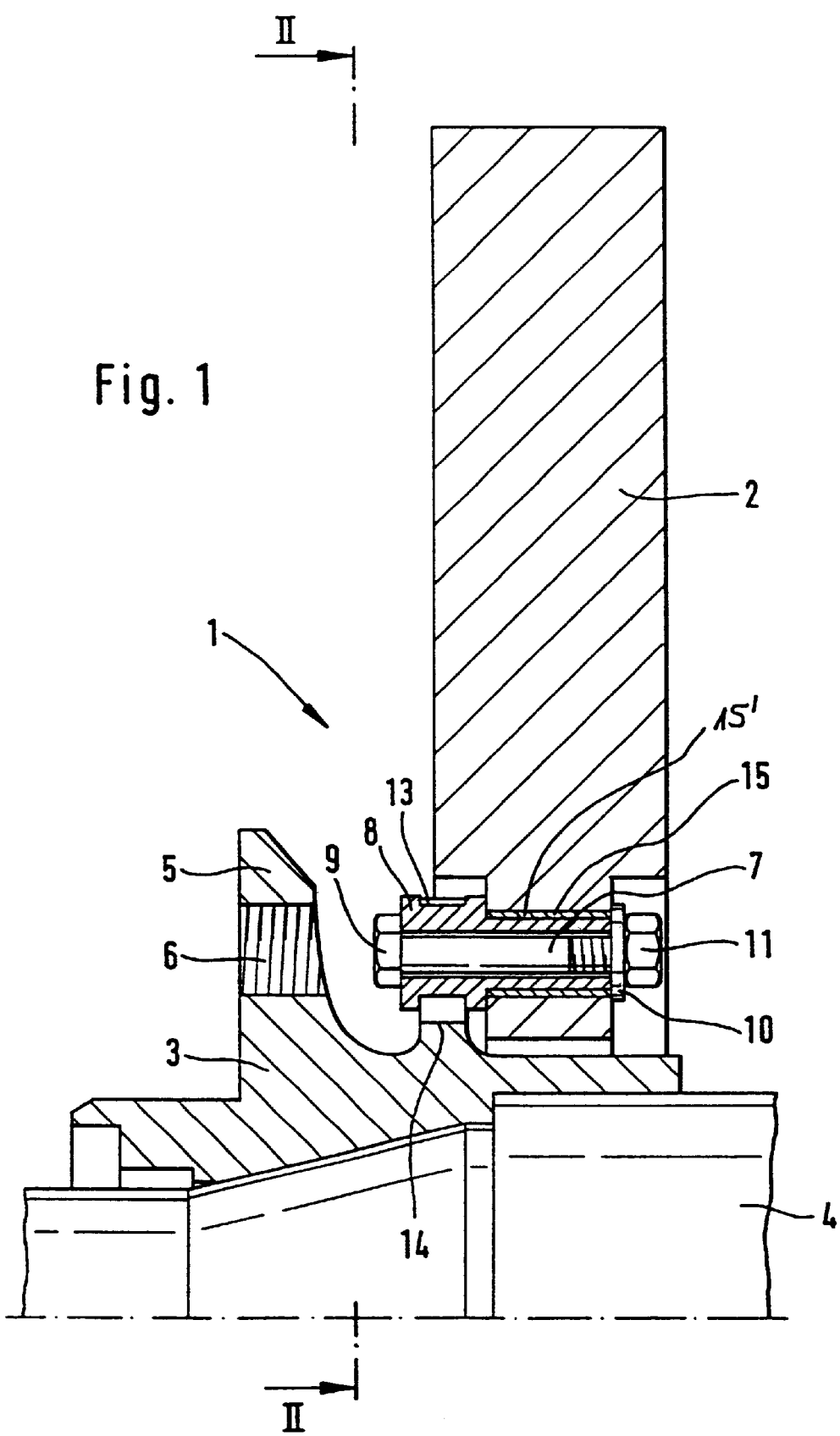
FIG. 1 shows a meridian partial section through a brake unit that comprises a friction ring and a hub constructed according to a preferred embodiment of the present invention.
Figure 2:
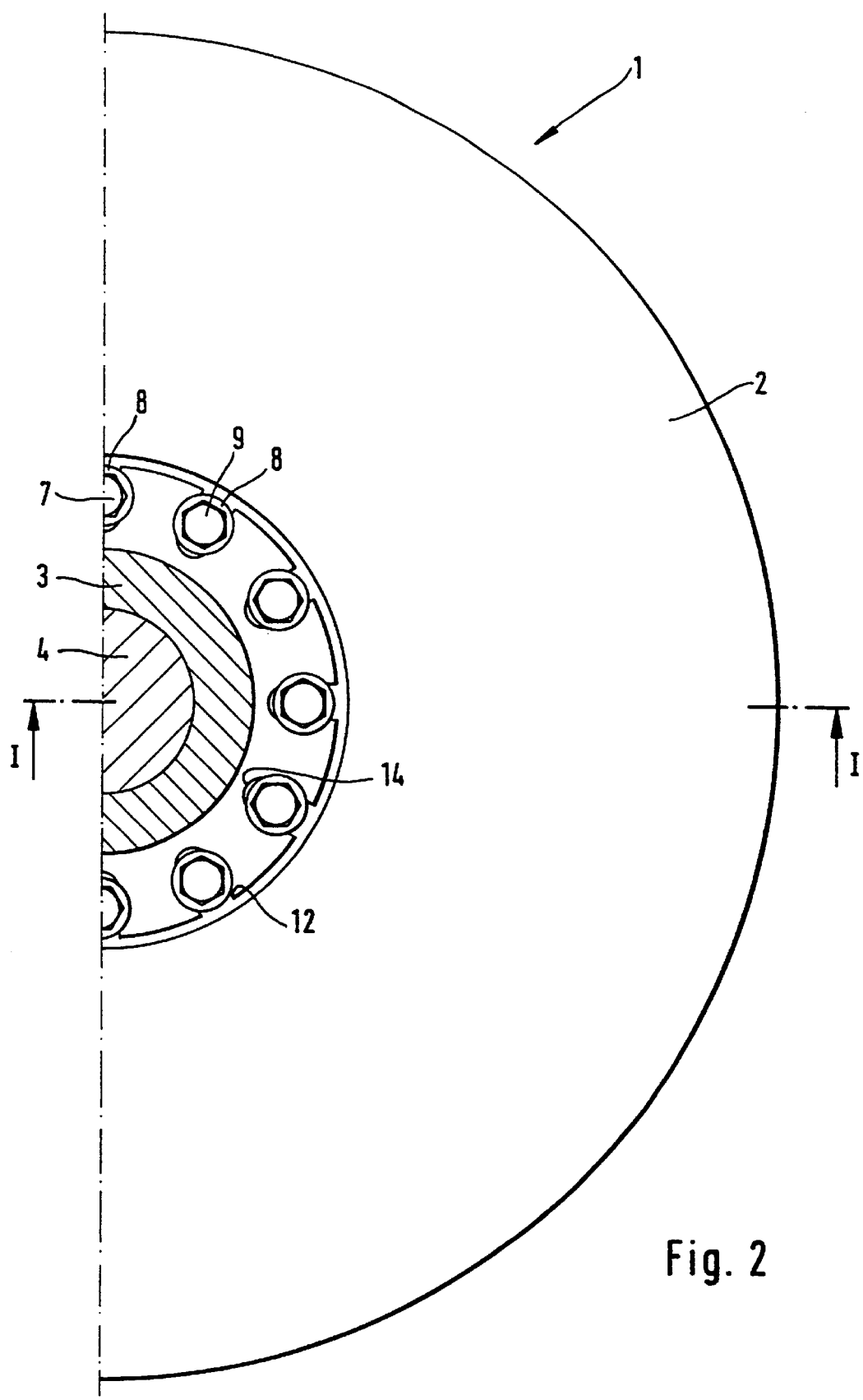
FIG. 2 is a view along Section II—II in FIG. 1.
Figure 3:
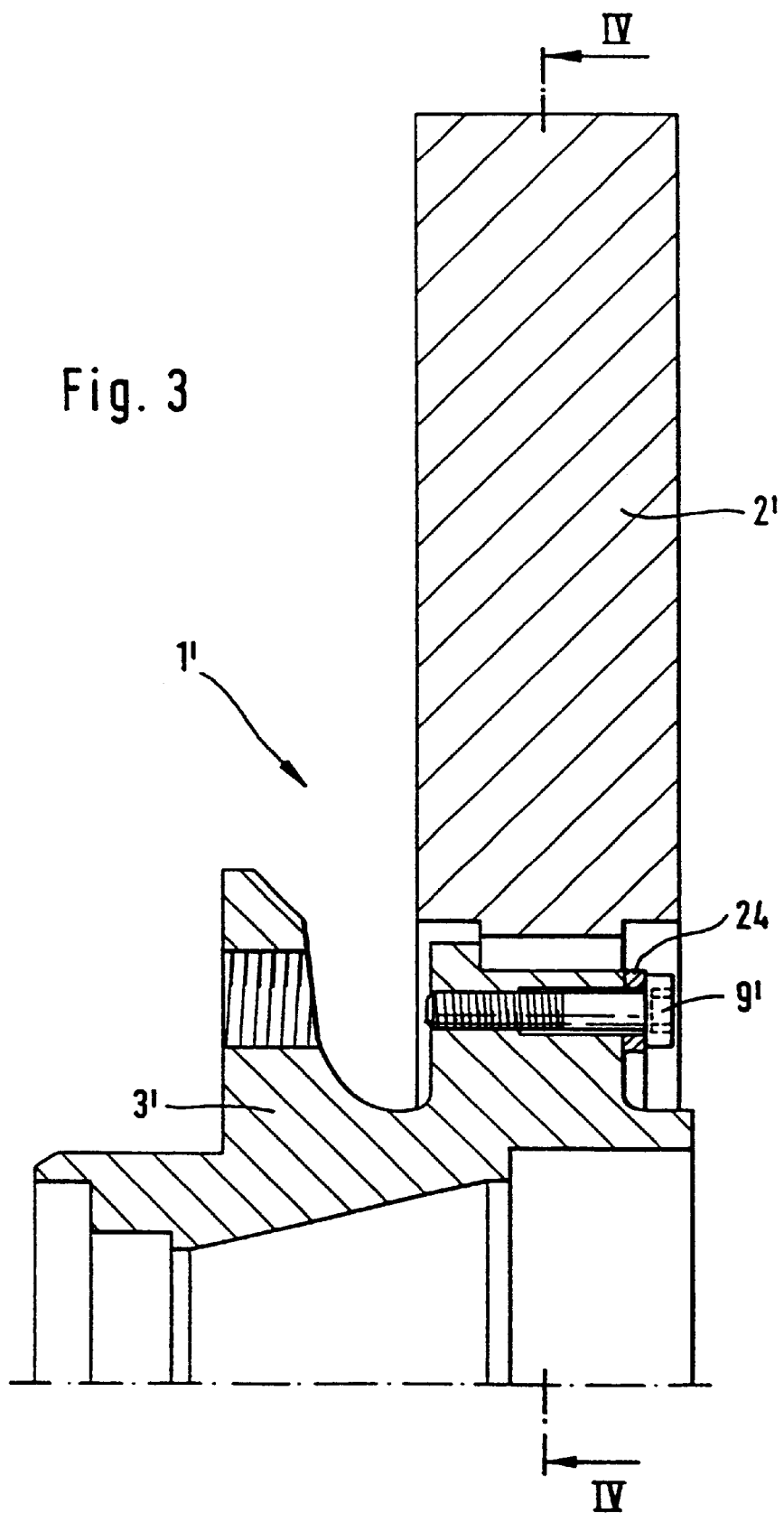
FIG. 3 is a meridian partial section through an alternative embodiment of a brake unit.
Figure 4:
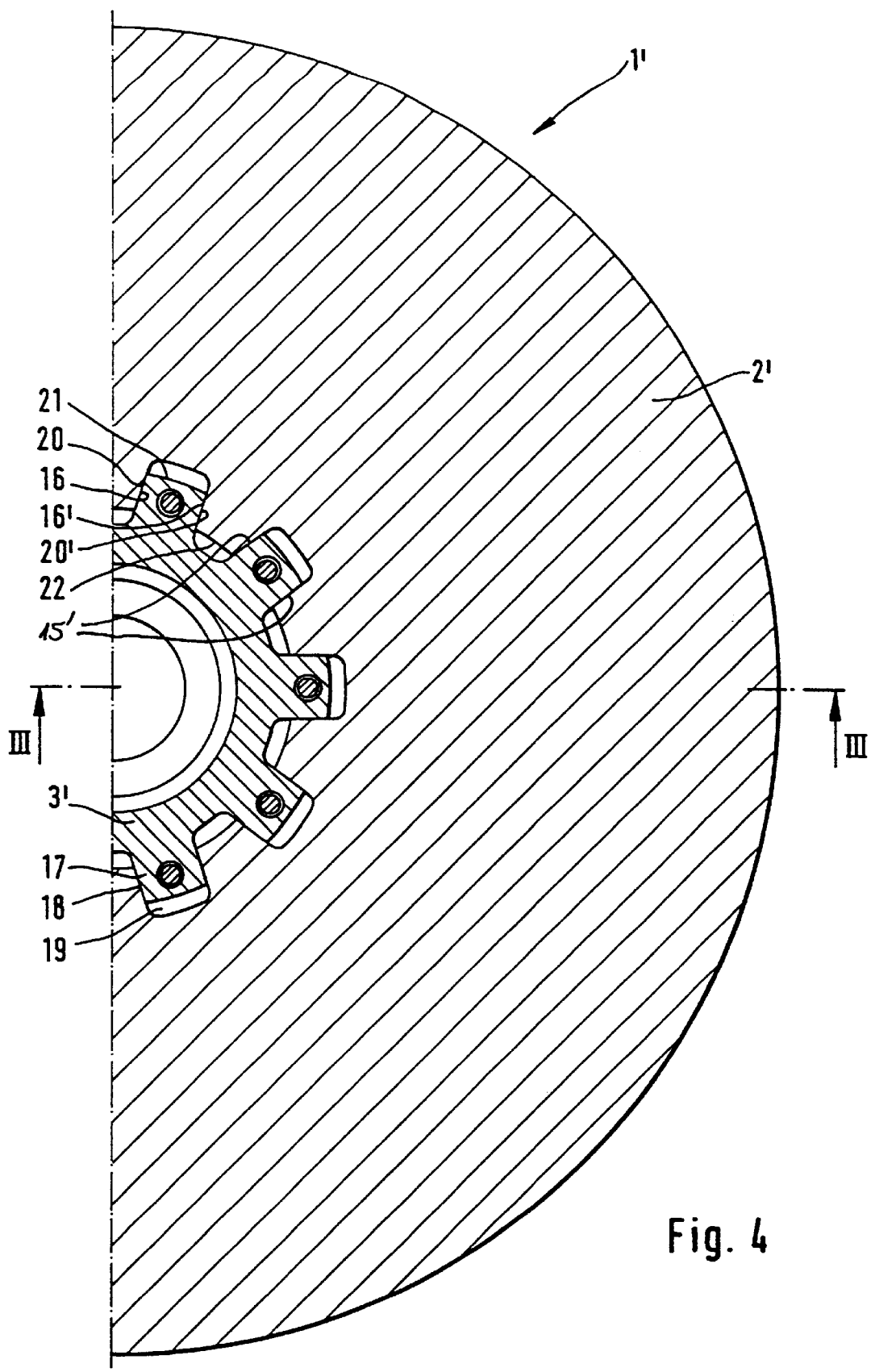
FIG. 4 is a view of the brake unit according to Section IV—IV in FIG. 3.

FIGS. 1 and 2 show a brake unit 1 according to the invention. Brake unit 1 comprises a friction ring 2 fastened to a hub 3. Hub 3 is mounted on a steering knuckle 4. Hub 3 also carries a flange 5 with threaded bores 6 for connecting a wheel (not shown). Friction ring 2 is fastened to hub 3 by fastening elements 7. Each fastening element 7 consists of a fastening bolt 8, a fastening screw 9 that extends through fastening bolt 8, a washer 10 placed on the end of fastening screw 9, and a hex nut 11. The hub 3 and friction ring 2 overlap radially in the vicinity of fastening element 7.

Friction ring 2 consists of a ceramic composite material. Such composite materials, in contrast to metals, have an extremely low coefficient of thermal expansion. Friction ring 2 undergoes severe heating in use which results in thermal expansion of hub 3 as a result of heat conduction; this expansion of the hub can be greater than that of friction ring 2. In order to guarantee a low-force mutual displacement between friction ring 2 and hub 3 and thus prevent damage to friction ring 2 by the different degrees of thermal expansion of friction ring 2 and hub 3, hub 3 is provided with radial slots 12 to receive fastening elements 7, in which slots fastening bolts 8 can slide in the radial direction. The width of slots 12 corresponds to the width of fastening bolt 8 in an area 13 in contact with hub 3. Slots 12 have a depth 14 in the radial direction that is greater than the maximum radial depth of penetration of fastening bolts 8 in slots 12 which exists in the case of a cold friction ring 2 and a warm hub 3.

The sliding seat of hub 3 allows radial displacements between friction ring 2 and hub 3. This so-called "floating" fastening leaves friction ring 2 centered and can transmit a torque to hub 3 through fastening elements 7. Friction ring 2 is disconnected in terms of heating by fastening bolts 8 so that the introduction of heat from friction ring 2 into hub 3 is considerably reduced.

In order to compensate for any divisional inaccuracies between the position of fastening elements 7 in friction ring 2 and the position of slots 12 in hub 3 and in order for all of the fastening elements 7 to participate to the same degree in the transfer of torque between friction ring 2 and hub 3, sleeves 15 are provided between friction ring 2 and fastening bolts 8 which have a wall thickness of about 1 mm and are provided with a slot that runs for their entire jacket height. These sleeves 15 can consist of a metal material, copper in particular, or can also be made from carbon-fiber-reinforced carbon. They have a heat-insulating plastically deformable layer 15' between friction ring 2 and fastening bolts B. As a result of loads imposed on the brake, the sleeves 15 are deformed and thus ensure uniform forces on all the fastening elements 7 and holes in ceramic friction ring 2 which has a relatively low damage tolerance because of its brittleness. The heat-insulating sleeves 15 between friction ring 2 and fastening bolts 8 also provide heat insulation between friction ring 2 and hub 3.

FIGS. 3 to 6 show an alternative design of a brake unit 1' according to the invention in which friction ring 2' is connected to hub 3' by a spline shaft profile. The edge of hub 3' facing friction ring 2' is made in the form of a shaft with teeth on the end which engages internal teeth on the edge of friction ring 2' that faces hub 3'. In the area of the teeth, hub 3' and friction ring 2' therefore overlap radially. Fastening elements 7 between friction ring 2' and hub 3' in this case are therefore formed by teeth 17 of the spline shaft toothing.

The two flanks 16, 16' of a tooth 17 located on the outer edge of hub 3' are designed so that they run parallel to one another in the radial overlapping area 18 of hub 3' and friction ring 2'. Friction ring 2' has matching recesses 19 whose flanks 20 likewise run parallel to one another in the radial overlapping area 18 of hub 3' and friction ring 2'. This parallel arrangement of flanks 16, 16', 20, 20' allows a low-force sliding of tooth flanks 16, 16' of hub 3' in recess 19 of friction ring 2' when hub 3' expands under the influence of heat. This low-force sliding must also be guaranteed when there are large differences in thermal expansion between hub 3'0 and friction ring 2'. To ensure this, flank pairs 16, 16' and 20, 20' must also run parallel to one another for a certain distance outside area 18 where they overlap directly. The flank pairs 20, 20' of the teeth of the friction ring must run parallel to one another radially outside head circle 21 of the hub teeth and flank pairs 16, 16' of the hub teeth must run parallel to one another radially inside head circle 22 of the friction ring teeth. The parallel design of the flanks ensures that there will be no radial jamming between hub 3' and friction ring 2'.

This spline shaft toothing between friction ring 2' and hub 3' permits a low-force radial relative movement of friction ring 2' and hub 3' with the design of flanks 16, 16', 20, 20' ensuring centering of friction ring 2'. The transfer of torque from friction ring 2' to hub 3' takes place through the opposite flank pairs 16, 20 and 16', 20'.

Figure 5:
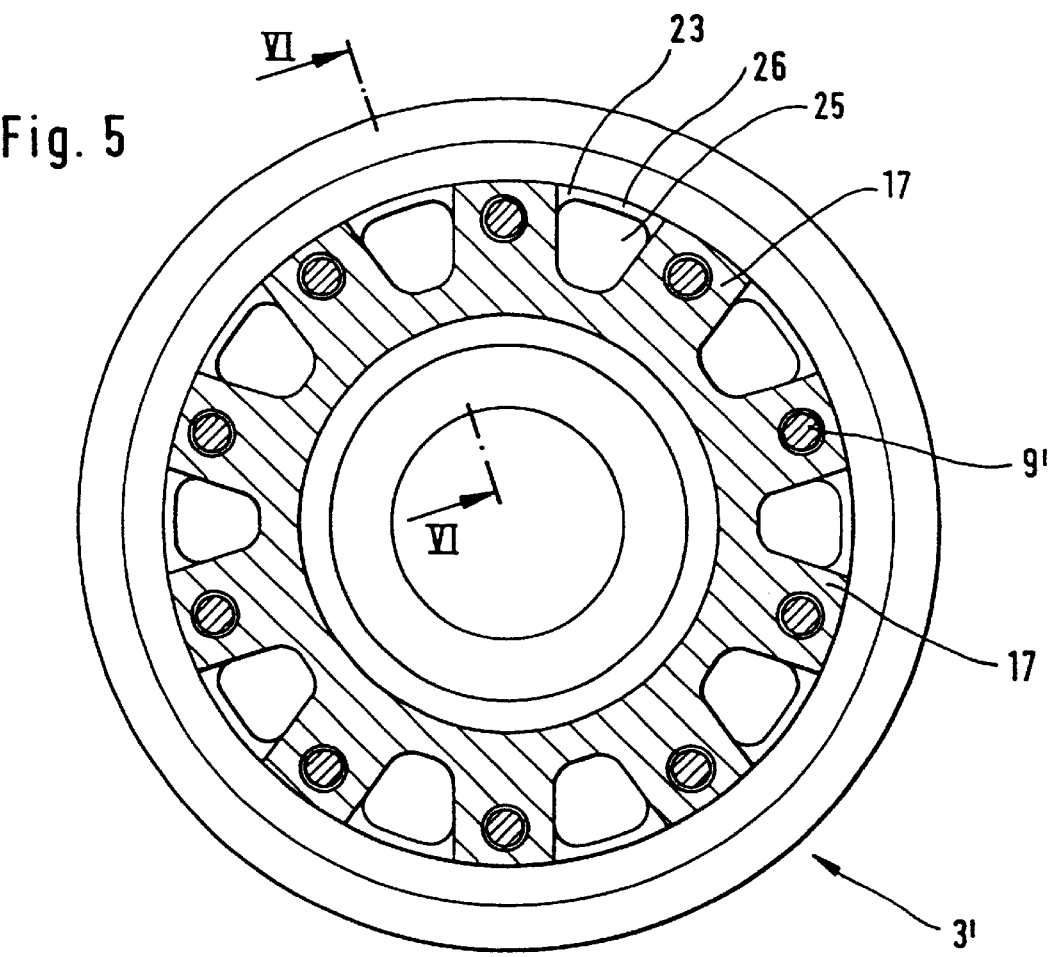
FIG. 5 is a view of the hub along Section IV—IV in FIG. 3.
Figure 6:
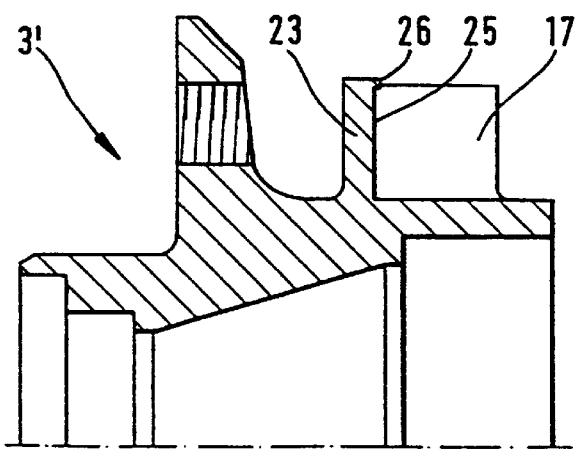
FIG. 6 is a view of the hub along Section VI—VI in FIG. 5.

For axial positioning of friction ring 2' on hub 3', hub 3' has a flange 23 which connects endwise in the axial direction with teeth 17 (see FIGS. 5 and 6). Friction ring 2' is secured opposite hub 3' axially by means of its radially symmetric locking ring 24 which is tensioned relative to hub 3' with the aid of fastening screws 9'.

To reduce the contact surface (and hence to reduce heat transmission) between hub 3' and friction ring 2', the flange has pocket-shaped milled areas 25 on the side opposite friction ring 2' so that friction ring 2' abuts only narrow ribs 26 of flange 23. In order to minimize the introduction of heat, these ribs 26 are additionally coated with a heat insulator.

To correct for inaccuracies in divisions in the spline shaft formed between friction ring 2' and hub 3', and to minimize the conduction of heat from friction ring 2' to hub 3', the contact areas between the opposite flank pairs 16, 20 and 16', 20' are provided with a plastically deformable heat-insulating layer 15'. When the brake is under load, this layer 15' is deformed and guarantees uniform distribution of the forces that develop on all of the flank pairs 16, 20 and 16', 20'. This layer 15' can be made of small plates inserted locally; alternatively, a heat-insulating plastically deformable ring can be inserted between friction ring 2' and hub 3' in the vicinity of the teeth. This ring covers the external teeth on hub 3' and/or the internal teeth on friction ring 2'. For thermal decoupling between hub 3' and friction ring 2', fiber damping materials can also be used on the contact surfaces 16, 20 and 16', 20' as well as in the vicinity of rib 26.

Figure 7:
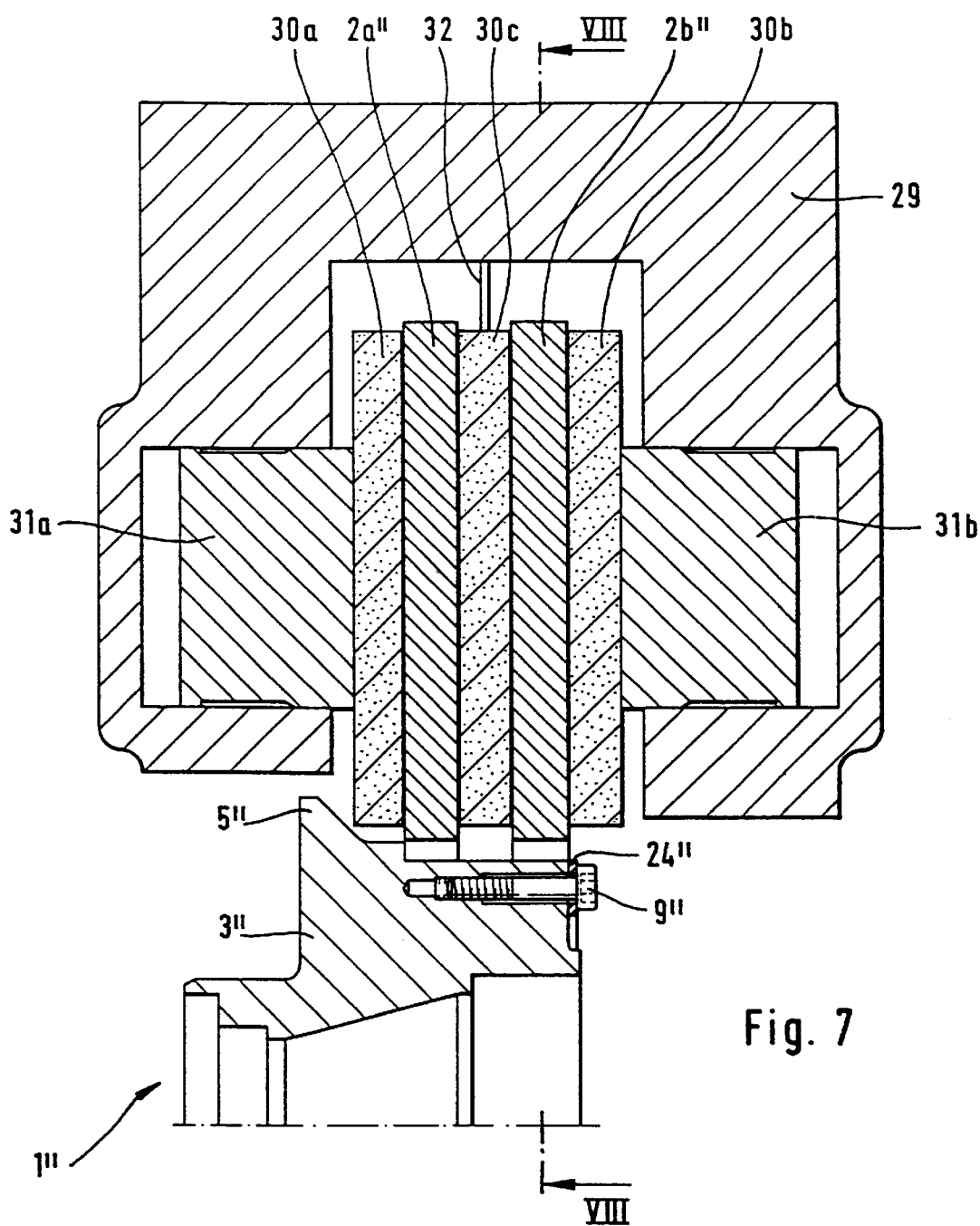
FIG. 7 is a meridian partial section of a brake unit with a double friction ring in a design as a fixed caliper brake according to another preferred embodiment of the present invention.
Figure 8:
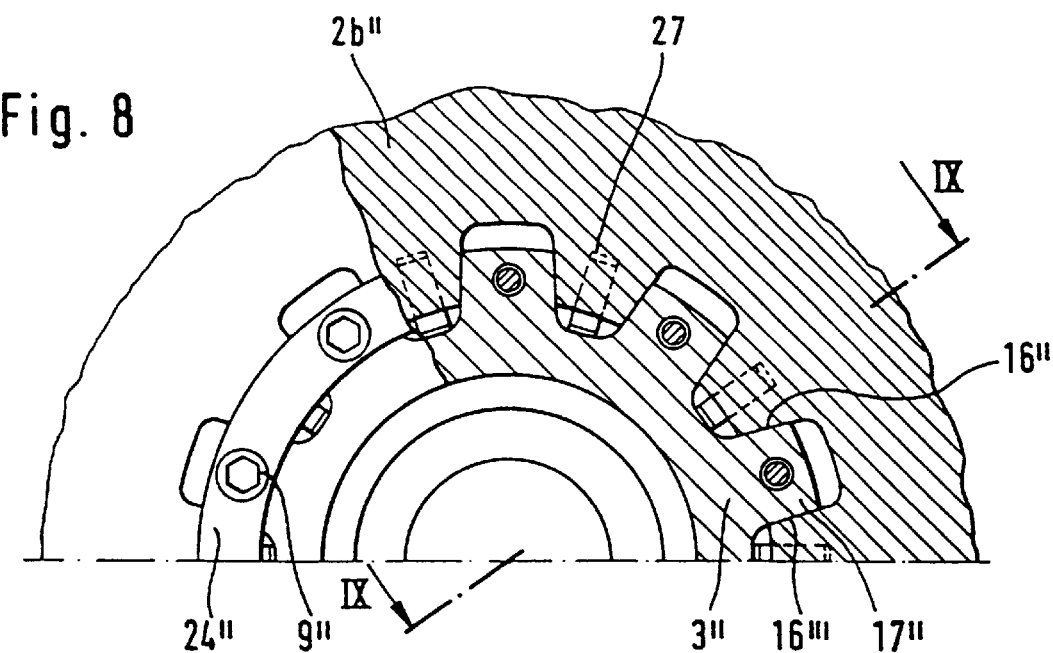
FIG. 8 is a view of the brake unit along Section VIII—VIII in FIG. 7.
Figure 9:
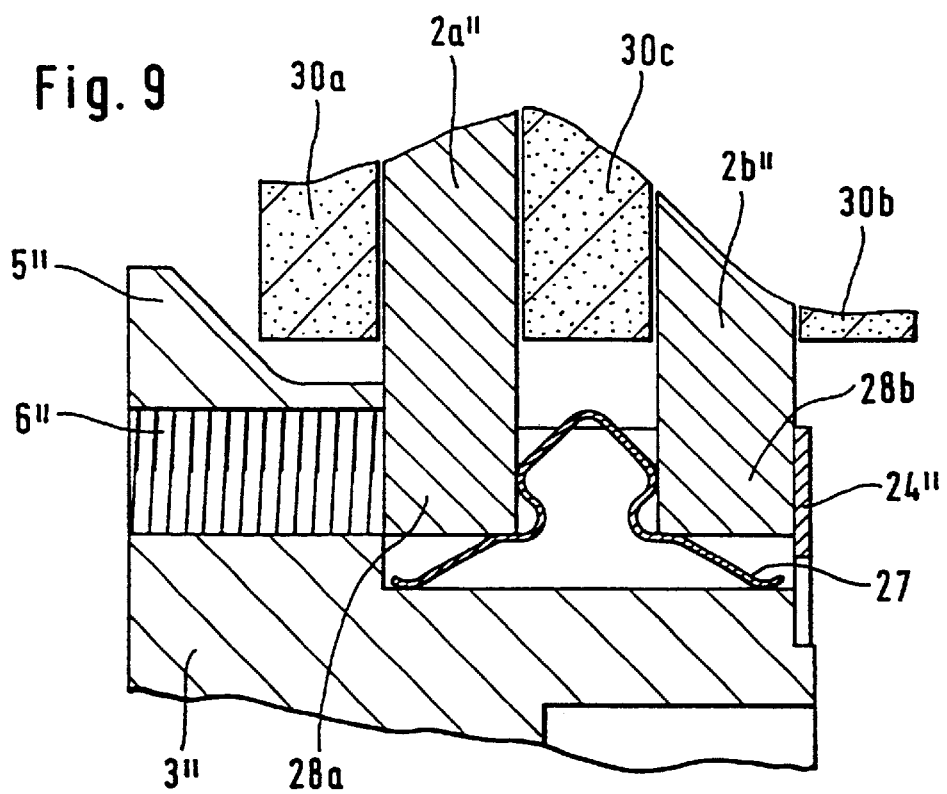
FIG. 9 is a radial partial section through the brake unit with a double friction ring along Section IX—IX in FIG. 8.

FIGS. 7 to 9 show another design for a brake unit 11" in which two friction rings 2a" and 2b" are connected to a hub 3" by means of a spline shaft profile. Both friction rings 2a" and 2b" are provided with internal teeth on the edges that face hub 3". These internal teeth engage a shaft on the outer edge of hub 3" that has teeth at the end. As in the embodiment described above, here again flanks 16" and 16'" of a tooth 17" located on the outer edge of hub 3" run parallel to one another. This ensures a low-force sliding of friction rings 2a" and 2b" relative to hub 3" and simultaneously ensures centering of friction rings 2a" and 2b". As described in the embodiment of FIG. 3, small plates made of a plastically deformable heat-insulating material are located along the contact surfaces of the spline shaft formed between friction rings 2a" and 2b" and hub 3".

Friction rings 2a" and 2b" are secured axially by means of a surrounding safety ring 24" relative to hub 3", said ring 24" being tensioned relative to hub 3" by mounting screws 9". Friction ring 2a" is pressed against a flange 5" provided on hub 3" which also has threaded bores 6" for fastening a wheel. Between the two friction rings 2a" and 2b", there are restoring springs 27 which ensure that friction rings 2a" and 2b" assume a certain minimum spacing between them when not in use. Restoring springs 27 are designed as metal clamps that are placed between teeth 28a and 28b of friction rings 2a" and 2b". In order to minimize the number of parts to be assembled, restoring springs 27 can be connected to safety ring 24" or can be designed in the form of projections on safety ring 24".

FIG. 7 shows the use of brake unit 1" with two friction rings 2a" and 2b" in a fixed caliper disk brake. The fixed caliper 29 contains three brake linings 30a, 30b, and 30c. The outer brake linings 30a and 30b are fastened to brake cylinders 31a and 31b while the middle brake lining 30c is secured in the middle of caliper 29 by a piece of sheet metal 32. When the brake is actuated, the outer brake linings 30a and 30b are pressed by brake cylinders 31a and 31b from the outside against friction rings 2a" and 2b". As a result of the force exerted by brake linings 30a and 30b, restoring springs 27 are compressed between friction rings 2a" and 2b" so that both friction rings 2a" and 2b" are pressed against middle brake lining 30c. In this case, therefore, both sides of each friction ring 2a" and 2b" contribute to the braking action. By comparison with the embodiment according to FIG. 3, with friction rings of the same size, twice the frictional area can be obtained. If the braking pressure exerted by brake cylinders 31a and 31b is reduced at the end of the braking process, friction rings 2a" and 2b" are forced apart by restoring springs 27 to the point where they no longer touch middle brake lining 30c. To achieve this, restoring springs 27 are so dimensioned that when brake unit 1" is not in use, friction rings 2a" and 2b" stop at a mutual distance which is slightly greater than the thickness of the middle brake lining 30c. By choosing suitable restoring springs 27, the return of friction rings 2a" and 2b" can be adjusted to the thickness of the lining on the middle brake lining 30c. Thus, a constant clearance can be provided between lining 30c and friction rings 2a" and 2b" as lining wear increases.

The arrangement of the two friction rings 2a" and 2b" which are pushed apart by restoring springs 27 produces good ventilation of brake unit 1" since the air can circulate freely between the friction rings.

As an alternative to the fixed caliper disk brake shown in FIG. 7, brake unit 1" with two friction rings 2a" and 2b" can also be used in a sliding caliper disk brake.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Brake unit with a friction ring made of a ceramic material that is connected directly to a hub, said hub being made in the form of a sleeve which includes a steering knuckle and to which a wheel is fastened, and with an outer edge of the hub radially overlapping an inner edge of the friction ring and having fastening elements in this overlapping area to connect the friction ring to the hub, wherein the contact surface between the friction ring and the fastening elements is provided with a plastically deformable heat-insulating layer.

2. Brake unit according to claim 1, wherein the fastening elements between the friction ring and the hub are formed by a circle of fastening bolts that axially penetrate the overlapping edges of the friction ring and the hub, and fastening bolts are covered by plastically deformable heat-insulating sleeves.

3. Brake unit according to claim 2, wherein the hub has radial driving slots to receive the fastening bolts.

4. Brake unit according to claim 1, wherein the brake unit comprises two friction rings that are located parallel to one another and connected with the hub.

5. Brake unit according to claim 4, wherein a restoring spring is located between the two friction rings, said spring holding the friction rings a fixed distance apart when they are not in use.

6. Brake unit according to claim 4, wherein a brake lining is located on either side of each friction ring, said brake linings being fastened to a brake caliper, wherein two of the brake linings located between the friction rings are permanently connected together and have a combined thickness less than a distance between the friction rings when not in use.

7. Brake unit according to claim 1, wherein the fastening elements are formed on the hub by a spline shaft profile on an outer edge of the hub, which engages a spline shaft profile provided on an inner edge of the friction ring, and wherein the contact surfaces between the friction ring and the hub are provided with the plastically deformable heat insulating layer.

8. Brake unit according to claim 1, wherein the friction ring consists of a frictional material selected from the group of fiber reinforced ceramics.

9. Vehicle brake assembly comprising:

a hub, a friction ring including ceramic material and radially overlapping with radial outer portions of the hub, fastening elements fastening the friction ring to the hub, said fastening elements having contact surfaces engageable in use with the friction ring, and a plastically deformable heat-insulating layer interposed between the contact surfaces and the friction ring.

10. Vehicle brake assembly according to claim 9, wherein the fastening elements are axially extending fastening bolts which in use penetrate radially overlapping portions of the friction ring and hub, and wherein the plastically deformable heat-insulating layer is provided by sleeves surrounding the bolts.

11. Vehicle brake assembly according to claim 10, wherein the hub has radial driving slots to receive the fastening bolts.

12. Vehicle brake assembly according to claim 11, wherein the friction ring consists of a frictional material selected from the group of fiber reinforced ceramics.

13. Vehicle brake assembly according to claim 9, further comprising a second friction ring, said two friction rings being parallel to one another and fastened to the hub by the fastening elements.

14. Vehicle brake assembly according to claim 13, wherein a restoring spring is located between the two friction rings, said spring holding the friction rings a fixed distance apart when they are not in use.

15. Vehicle brake assembly according to claim 13, wherein a brake lining is located on either side of each friction ring, said brake linings being fastened to a brake caliper, wherein two of the brake linings located between the friction rings are permanently connected together and have a combined thickness less than a distance between the friction rings when not in use.

16. Vehicle brake assembly according to claim 9, wherein the fastening elements are formed on the hub by a spline shaft profile on an outer edge of the hub, which engages a spline shaft profile provided on an inner edge of the friction ring, and wherein the contact surfaces between the friction ring and the hub are provided with the plastically deformable heat insulating layer.

17. Vehicle brake assembly according to claim 9, wherein the friction ring consists of a frictional material selected from the group of fiber reinforced ceramics.

18. A method of making a vehicle brake assembly comprising:

providing a hub, positioning a friction ring including ceramic material to be radially overlapping with radial outer portions of the hub, fastening the friction ring to the hub with fastening elements, said fastening elements having contact surfaces engageable in use with the friction ring, and interposing a plastically deformable heat-insulating layer between the contact surfaces and the friction ring.

19. A method according to claim 18, wherein the fastening elements are axially extending fastening bolts which in use penetrate radially overlapping portions of the friction ring and hub, and wherein the plastically deformable heat-insulating layer is provided by sleeves surrounding the bolts.

\* \* \* \* \*